(12) United States Patent
Barajas et al.

(10) Patent No.: US 8,234,629 B2
(45) Date of Patent: Jul. 31, 2012

(54) READY-TO-USE MEDIA CENTER SYSTEMS THROUGH CUSTOM PRECONFIGURATION

(75) Inventors: Gaston M. Barajas, Austin, TX (US); Shree A. Dandekar, Round Rock, TX (US); Abhinav Gupta, Austin, TX (US)

(73) Assignee: Dell Products L.P., Round Rock, TX (US)

(*) Notice: Subject to any disclaimer, the term of this patent is extended or adjusted under 35 U.S.C. 154(b) by 1400 days.

(21) Appl. No.: 11/830,889

(22) Filed: Jul. 31, 2007

(65) Prior Publication Data

US 2009/0037901 A1 Feb. 5, 2009

(51) Int. Cl.
*G06F 9/44* (2006.01)
*G06F 9/445* (2006.01)

(52) U.S. Cl. ........................ 717/121; 717/174
(58) Field of Classification Search ................. 717/121, 717/174
See application file for complete search history.

(56) References Cited

U.S. PATENT DOCUMENTS

| | | | | |
|---|---|---|---|---|
| 4,866,434 A * | 9/1989 | Keenan | | 340/12.17 |
| 5,991,543 A | 11/1999 | Amberg et al. | | 395/712 |
| 5,995,757 A | 11/1999 | Amberg et al. | | 395/712 |
| 6,167,383 A | 12/2000 | Henson | | 705/26 |
| 6,182,275 B1 | 1/2001 | Beelitz et al. | | 717/1 |
| 6,236,901 B1 | 5/2001 | Goss | | 700/95 |
| 6,327,706 B1 | 12/2001 | Amberg et al. | | 717/11 |
| 7,656,464 B2 * | 2/2010 | Pfiffer | | 348/734 |
| 2003/0225631 A1 * | 12/2003 | Howell et al. | | 705/27 |
| 2005/0160468 A1 * | 7/2005 | Rodriguez et al. | | 725/109 |
| 2005/0283799 A1 * | 12/2005 | Domegan et al. | | 725/38 |
| 2008/0066118 A1 * | 3/2008 | Igoe | | 725/75 |

OTHER PUBLICATIONS

Daniel, "Universal Remote Control Codes", Jun. 2006, http://replay.waybackmachine.org/20060610124239/http://www.tvcodes.com/.*
RemoteCentral.com, "Universal Remote Control Manuals", Mar. 2005, pp. 1-4, http://web.archive.org/web/20050312091020/http://www.remotecentral.com/cgi-bin/files/rcfiles.cgi?area=other&db=devices&br=&fc=.*

* cited by examiner

*Primary Examiner* — Wei Zhen
*Assistant Examiner* — Lanny Ung
(74) *Attorney, Agent, or Firm* — Hamilton & Terrile, LLP; Stephen A. Terrile

(57) ABSTRACT

A method and system which enable preconfiguration of an information handling system to function as a media hub. In certain embodiments, during the preconfiguration a customer can select media services such as television services (e.g., Cable TV or Dish Network Service provider) and an information handling system manufacturer can then preconfigure the information handling system during a factory install process for the selected television provider. Additionally, the preconfiguration process can load media guides onto the preconfigured information handing systems during the factory install process. Additionally, in certain embodiments, if a remote control for a receiver is found, then the remote control settings can be preinstalled onto the information handling system. When a user receives the preconfigured information handling system, all that is necessary to setup the system is to couple an IR emitter to the receiver.

15 Claims, 4 Drawing Sheets

READY-TO-USE MEDIA CENTER SYSTEMS THROUGH CUSTOM PRECONFIGURATION

BACKGROUND OF THE INVENTION

1. Field of the Invention

The present invention relates to information handling systems, and more particularly to providing ready to use media center information handling systems via customer preconfiguration.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with media functionality. For example, Dell, Inc. often provides a Media Center Edition (MCE) information handling systems. MCE information handling systems enable the user to use multimedia technology such as: TV Tuners, FM Tuners, Video Capture Devices, Digital Cameras and more. These features can enable an information handling system to become a media hub for all of a customer's multimedia needs.

One challenge of MCE information handling systems is providing MCE information handling systems that are user friendly and simple to configure. For example, with known MCE information handling systems, many setup screen presentations can be required before the information handling system can be used as a media hub. For example, in one known system, more than 40 setup screen presentations are necessary before the MCE information handling system can be used as a media hub. The setup process includes a plurality of steps such as Set Up TV Signal; Set Up Speakers; Set Up Remote Control; and Configure TV or Monitor. The process can be unfriendly to novice users. In addition to being time consuming and tedious, the media hub set up process can also lead to generating technical support calls.

Accordingly, it would be desirable to provide an ability to preconfigure an information handling system to function as a media hub.

SUMMARY OF THE INVENTION

In accordance with the present invention, a method and system are disclosed which enable preconfiguration of an information handling system to function as a media hub. In certain embodiments, during the preconfiguration a customer can select media services such as television services (e.g., Cable TV or Dish Network Service provider) and an information handling system manufacturer can then preconfigure the information handling system during a factory install process for the selected television provider. Additionally, the preconfiguration process can load media guides onto the preconfigured information handing systems during the factory install process. Additionally, in certain embodiments, if a remote control for a receiver is found, then the remote control settings can be preinstalled onto the information handling system. When a user receives the preconfigured information handling system, all that is necessary to setup the system is to couple an IR emitter to the receiver.

During the configuration of the information handling system, if additional media devices (such as TV Tuners, FM Tuners, and Video capture devices) are also ordered, then the information handling system can be configured to support these additional media devices. The system and method of the present invention provides a mechanism to tie Broadband subscription service related upsells with MCE upsells. For example, if a customer has chosen Time Warner Broadband service and already has Time Warner Cable then the user can be provided with an option to upgrade to an MCE system with all the MCE related information automatically preconfigured.

More specifically, in one embodiment, the invention relates to a system for enabling configuration of a media center enabled (MCE) information handling system which includes a configurator and a media preconfiguration module. With options selected according to user input, the configurator configures the MCE information handing system. The media preconfiguration module configures media control functions of the MCE information handling system according to user input media information.

In another embodiment, the invention relates to a method for enabling configuration of a media center enabled (MCE) information handling system which includes configuring the MCE information handling system with options selected according to user input, configuring media control functions of the MCE information handling system according to user input media information, and installing the media control functions onto the MCE information handling system during fabrication of the MCE information handling system.

In another embodiment, the invention relates to a media center enabled (MCE) information handling system which includes a processor and memory coupled to the processor. The memory comprises instructions, stored on the memory during fabrication of the MCE information handling system, for configuring media control functions of the MCE information handling system according to user input media information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An on-line store is one component of an Internet website to which a customer may go to configure a particular information handling system, for example, according to desired options of the customer. The on-line store is typically a subset of a larger Internet website. At the on-line store, a customer can select one or more products in which the customer is interested. Upon selection of a particular product, the on-line store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the on-line store application controls.

Figure 1:
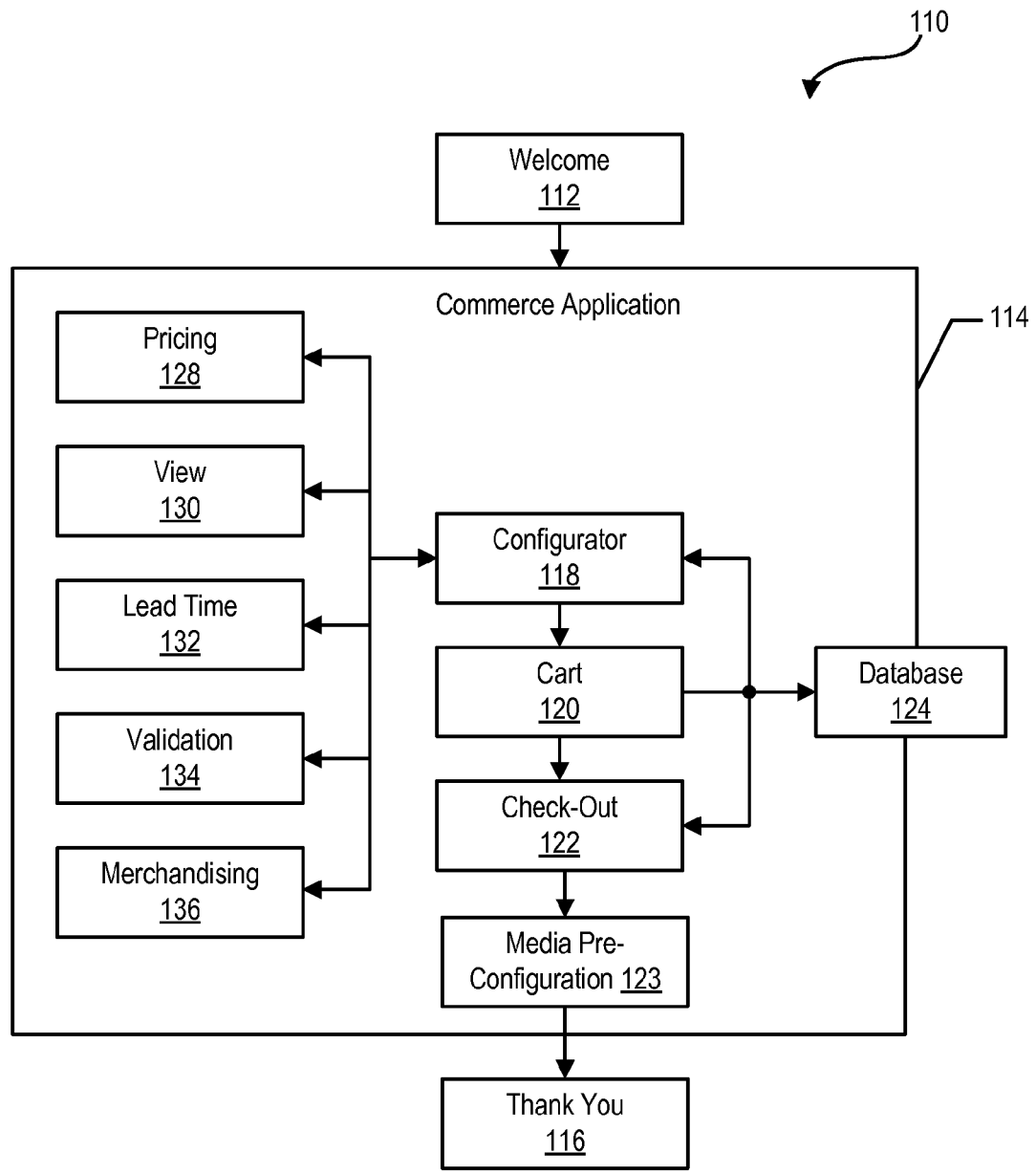
FIG. 1 shows an overview block diagram representation of an on-line store.

Referring now to FIG. 1, an on-line store 110 for use in generating customer configured information handling systems, e.g., customer configured computer systems, is shown. The on-line store 110 includes a welcome or introductory module 112, a commerce application module 114, and a thank you module 1 16. The on-line store 110 includes an on-line store user interface which enables the system configuration, pricing, and ordering of an information handling system via the Internet. The commerce application 114 includes a configurator 118, shopping cart 120, a checkout module 122, a media preconfiguration module 123 and database 124. The database 124 provides information to the configurator 118, shopping cart 120, checkout module 122 and media preconfiguration module 123. The configurator 118 includes a pricing module 128, a view module 130, a lead time warning module 132, a validation (or compatibility) warning module 134, and a merchandising module 136. The various modules of the configurator 118 are driven by data from the database 124, and thus the configurator 118, shopping cart 120, and checkout module 122 are all linked to the database 124.

In operation of the on-line store 110, the welcome module 112 presents a welcome page 112, the configurator 118 presents a configurator page, the shopping cart 120 presents a shopping cart page, the checkout module 122 presents a checkout page, the media preconfiguration module 123 presents a media preconfiguration page and the thank you module 116 presents a thank you page. The welcome page includes a static page and generally resides outside of the commerce application 114. The configurator page, shopping cart page, checkout page and media preconfiguration are within the commerce application and use information provided by the database. The checkout includes a payment feature, delivery feature, personal verses business feature, and instructional text features (i.e., how to fill out an on-line form.)

The welcome page is typically an introductory page and includes a link into the on-line store 110. The welcome page is typically a static welcome page. Upon completion of configuration of a system, the customer is transferred to a checkout page. After completion of the checkout, the customer is transferred to a media preconfiguration page. After completion of a media preconfiguration operation, the customer is transferred to a static thank you page 1 16. The thank you page 116 provides a message of gratitude to the customer for having placed the order or for visiting the on-line store.

Aspects of the configurator 118 which interact with database 124 are shown in FIG. 1. In essence, the entire commerce application 114 interacts with the database. The configurator 118, shopping cart 120, checkout module 122 and media preconfiguration module 123 are each part of the commerce application 114 and interact with the database 124. For example, with the shopping cart 120, additional merchandising information associated with a particular system which has been configured and placed in the shopping cart by an on-line store customer can be provided.

The media preconfiguration module 123 enables preconfiguration of the configured information handling system to function as a media hub. In certain embodiments, during the preconfiguration process a customer can select media services such as television services (e.g., Cable TV or Dish Network Service provider) and an information handling system manufacturer can then preconfigure the information handling system during a factory install process for the selected television service. Additionally, the preconfiguration process can allow a customer in configure the information handling system to include preloaded media guides. Additionally, in certain embodiments, the preconfiguration process can allow a customer to identify a remote control and to configure the information handling system to install settings for the identified remote control. When a user receives the preconfigured information handling system, all that is necessary to setup the information handling system to control other media devices via the remote control is to couple an IR emitter that can communicate with other media devices such as a home theater receiver.

Figure 2:
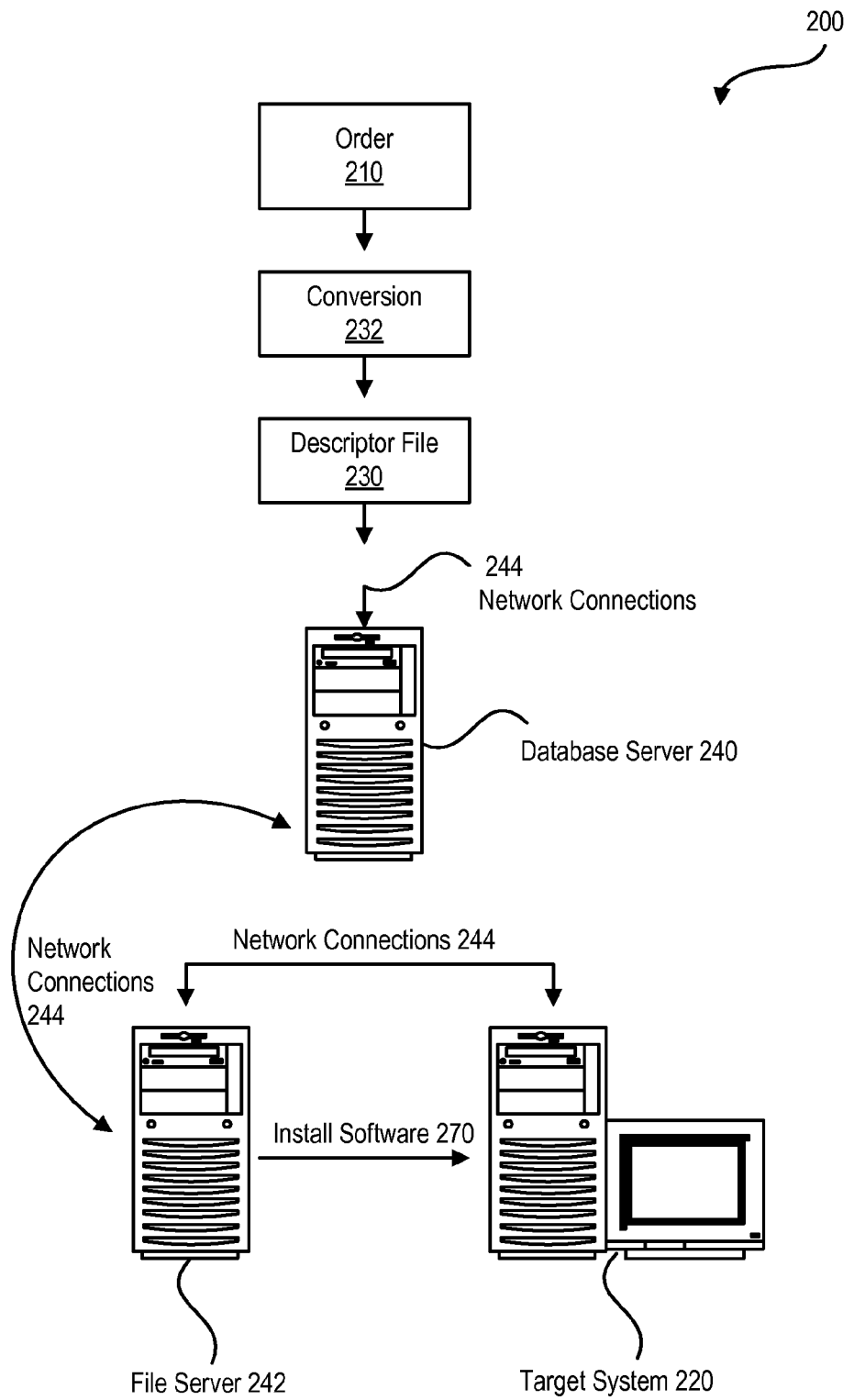
FIG. 2 shows a schematic diagram of a system for installing software.

FIG. 2 is a schematic diagram of a software installation system 200 at an information handling system manufacturing site. In operation, an order 210 is placed to purchase a target information handling system 220, via, e.g., the on-line store. The target information handling system 220 to be manufactured contains a plurality of hardware and software components. For instance, target information handling system 220 might include a certain brand of hard drive, a particular type of monitor, a certain brand of processor, as well as particular software products and preordered services. The software may include a particular version of an operating system along with all appropriate driver software and other application software along with appropriate software bug fixes. Before target information handling system 220 is shipped to the customer, the plurality of components are installed and tested. Such software installation and testing advantageously ensures a reliable, working information handling system which is ready to operate when received by a customer.

The installation includes installing components based upon the media preconfiguration. The testing includes testing for components that were installed based upon the media preconfiguration.

Because different families of information handling systems and different individual computer components may require different software installations, it is desirable to determine which software to install on a target information handling system 220. A descriptor file 230 is provided by converting an order 210, which corresponds to a desired information handling system having desired components, into a computer readable format via conversion module 232. The descriptor file 230 includes components component descriptors corresponding to components determined to be desirable based upon the ecosystem validation process.

Component descriptors are computer readable descriptions of the components of target information handling system 220 which components are defined by the order 210. In a preferred embodiment, the component descriptors are included in a descriptor file called a system descriptor record (SDR) which is a computer readable file containing a listing of the components, both hardware and software, to be installed onto target information handling system 220. Having read the plurality of component descriptors, database server 240 provides an image having a plurality of software components corresponding to the component descriptors to file server 242 over network connection 244. Network connections 244 may be any network connection well-known in the art, such as a local area network, an intranet, or the internet. The information contained in database server 240 is often updated such that the database contains a new factory build environment. The software is then installed on the target information handling system 220 via file server 242. The software is installed on the target information handling system via the image. The image may include self-configuring code.

The components also include media components. The media components enable the target information handling system 220 to function as a media center edition (MCE) information handling system. The media components include a media configuration file as well as components for interacting with and controlling various media devices.

Figure 3:
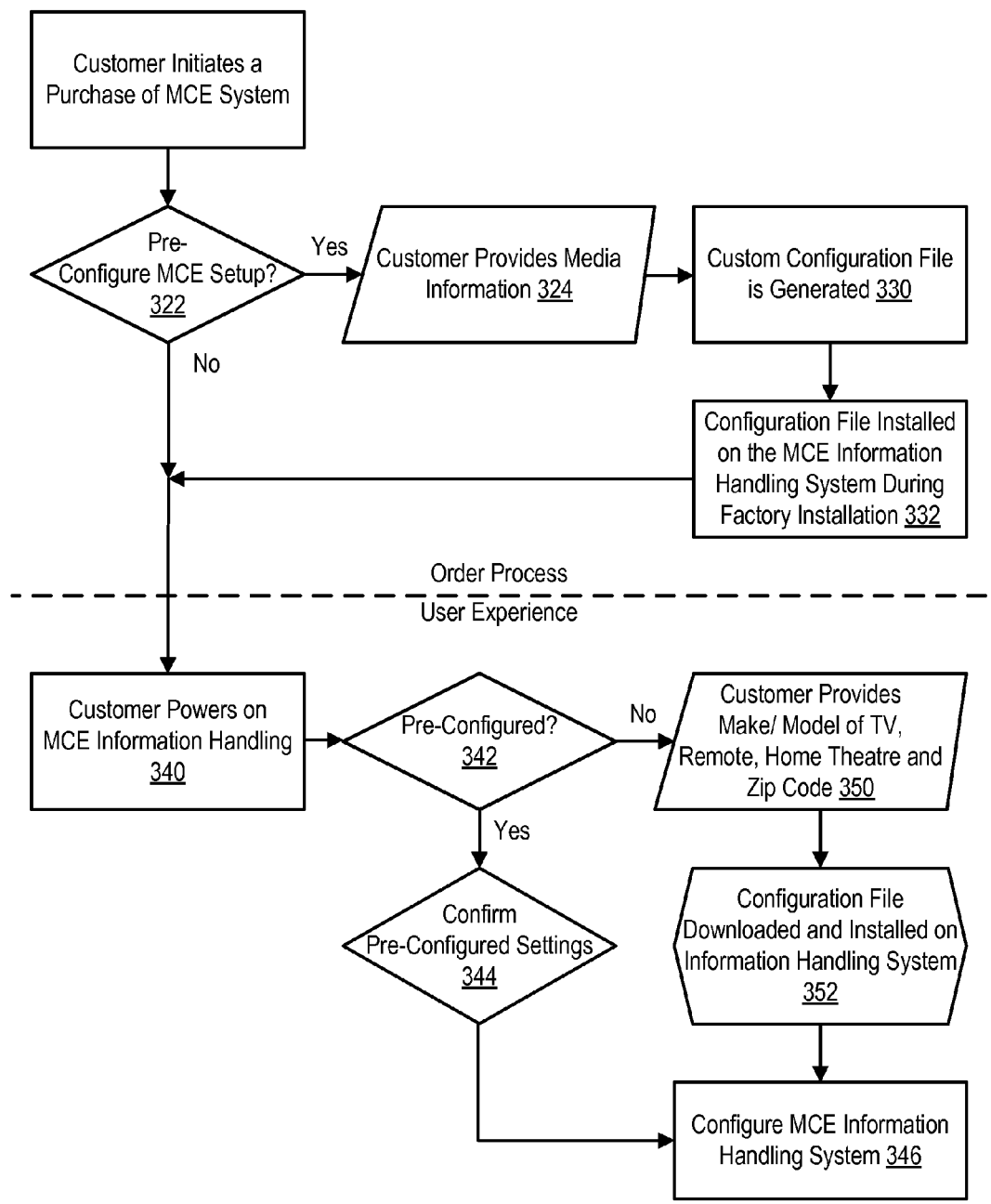
FIG. 3 shows a flow chart of the operation of a system for preconfiguring an information handling system to function as a media hub.

Referring to FIG. 3, a flow chart of the operation of a system for preconfiguring an information handling system to function as a media hub is shown. The system for preconfiguring an information handling system to function as a media hub includes a preconfiguration portion 310 (e.g., such as that accomplished via media preconfiguration module 123) and a user experience portion 312. The user experience portion 312 is the part of the system which takes the preconfiguration information provided by the customer during configuration of the information handling system, preconfigures an information handling system and provides the media preconfigured information handling system to the customer.

More specifically, while a customer is configuring an MCE information handling system at step 320, the customer is queried regarding whether the customer desires to preconfigure the MCE information handling system at step 322. If the customer indicates a desire to preconfigure the MCE information handling system, then the customer provides media information to the media preconfiguration module 123 at step 324. The media information can include information such as a Make and Model of a TV/Monitor that will be coupled to the MCE information handling system; a Make and Model of a remote control if customer is going to use a remote control not included with the information handling system purchase; a make and model of home theater equipment that will be used with the MCE information handling system; and a physical location (e.g., via a Zip Code) of where the MCE information handling system will be used.

The system for preconfiguring a MCE information handling system uses the media information to generate a custom media configuration file at step 330. The customer media configuration file facilitates automatic setup of MCE information handling system without any interaction or intervention from the user.

The media information is used to generate the configuration file that is custom based upon the media information provided during configuration of the MCE information handling system. More specifically, the make and model of the display device is used to determine whether the display device is television, a built-in display, a flat panel display, a rear or front projection monitor. Additionally, the make and model information is used to determine a default aspect ratio of the display. The make and model of the remote control is used to determine remote codes as well as default IR speed of the remote control. The make and model of the remote control can also be used with the other media information to allow programming of the remote control for the other media devices that will interact with the media hub. The make and model of the home theater equipment allows the MCE information handling system to be configured with an appropriate speaker arrangement (e.g., a two speaker arrangement, four speaker arrangements, a surround 5.1 speaker arrangement or a surround 7.1 speaker arrangement). The physical location information (e.g., the zip code) is used to determine a location from where a correct media guide (such as a TV Guide) can be downloaded for the user. The physical location information can also be used to identify potential television (or other content) service providers.

The custom configuration file is installed onto the MCE information handling system in the factory during factory installation of the various components of the MCE information handling system at step 332. When the user first turns on their information handing system at step 340, the user is provided with an option of whether to confirm the preconfiguration settings or change any settings at step 342. If the information handling system was preconfigured, then the system confirms the preconfigured media settings at step 344 and then automatically configures the information handling system at step 346. By configuring the information handling system, the system is ready for use as a media hub without the user having to provide additional information.

Additionally, during step 342, if the user did not preconfigure the media settings of the information handling system, then the customer is presented with the option of configuring the media settings. When the customer provides the media information at step 350, then the media configuration system communicates with the information handling system manufacturer. A configuration file which is customized based upon the entered media information is then created and downloaded and installed onto the information handling system at step 352.

Figure 4:
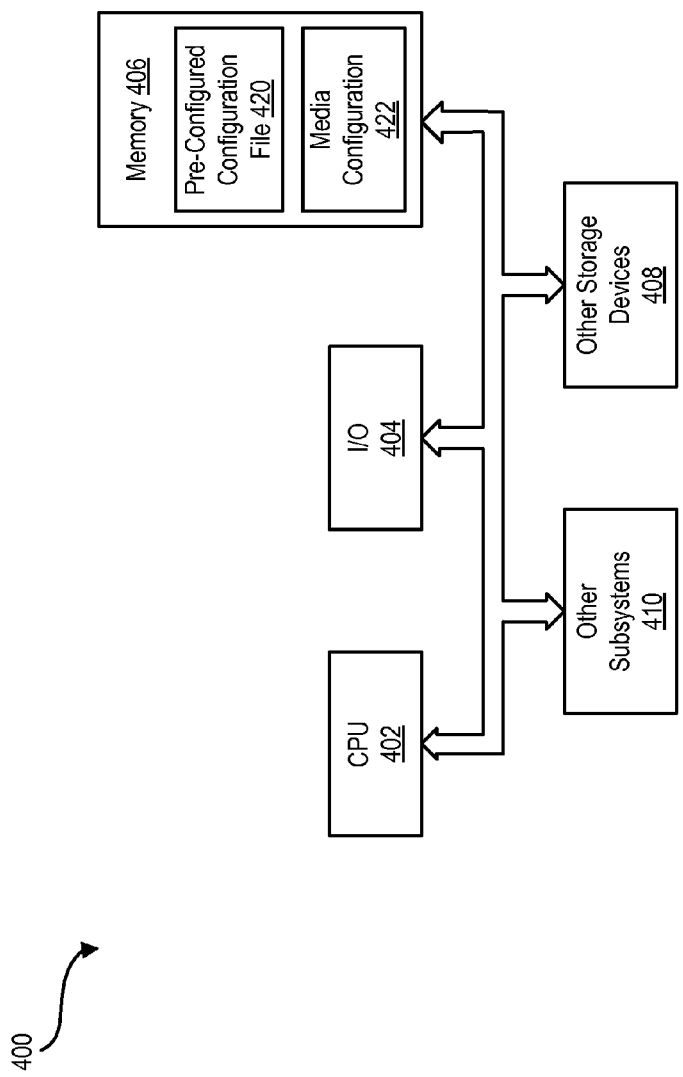
FIG. 4 shows a flow chart of a preconfigured information handling system.

The configuration file is customized via a query against a database (e.g., the database 240) to generate the custom configuration file. The configuration file is used to automatically configure the media functions of the MCE information handling system, thus allowing the user to avoid the multiple screen presentations generally needed to configure the media functions of the MCE information handling system Referring to FIG. 4, a system block diagram of an information handling system 400 such as target information handling system 220 is shown. The information handling system 400 includes a processor 402, input/output (I/O) devices 404, such as a display, a keyboard, a mouse, and associated controllers, memory 406 including non-volatile memory such as a hard disk drive and volatile memory such as random access memory, and other storage devices 408, such as an optical disk and drive and other memory devices, and various other subsystems 410, all interconnected via one or more buses, shown collectively as bus 412. The memory 406 also includes a preconfigured media configuration file 420 and/or a media configuration module 422. The preconfigured media configuration file is stored on the memory when the MCE information handling system is fabricated based upon a customer's MCE information handling system configuration. The media configuration module 422 may be executed by the processor to enable automatic configuration of media functions for systems in which media preconfiguration was not performed.

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for enabling configuration of a media center enabled (MCE) information handling system comprising:
   a configurator executing on a computer system, the configurator configuring the MCE information handing system with options selected according to user input; and,
   a media preconfiguration module executing on the computer system, the media preconfiguration module preconfiguring media control functions of the MCE information handling system according to user input media information during fabrication of the information handling system, the user input media information comprising a make and model of a remote control to be used with the MCE information handling system; and wherein
   the make and model of the remote control is used to determine remote codes, a default infrared IR speed of the remote control and to program the remote control for the other media devices that will interact with the MCE information handling system.

2. The system of claim 1 wherein:
   the user input media information comprises at least one of a make and model of a display device that will be coupled to the MCE information handing system, a make and model of home theater equipment to be used with the MCE information handing system and a physical location of where the MCE information handling system will be used.

3. The system of claim 2 wherein:
   the make and model of a device is used to determine whether a display device coupled to the information handling system is a television, a built-in display, a flat panel display, a projection monitor and to determine a default aspect ratio of the display.

4. The system of claim 2 wherein:
   the make and model of the home theater equipment allows the MCE information handling system to be configured with an appropriate speaker arrangement.

5. The system of claim 2 wherein:
   the physical location information is used to determine a location from where a correct media guide can be downloaded for the user.

6. A method for enabling configuration of a media center enabled (MCE) information handling system comprising:
   configuring the MCE information handing system with options selected according to user input;
   preconfiguring media control functions of the MCE information handling system according to user input media information; and,
   installing the media control functions onto the MCE information handling system during fabrication of the MCE information handling system, the user input media information comprising a make and model of a remote control to be used with the MCE information handling system; and wherein
   the make and model of the remote control is used to determine remote codes, a default infrared IR speed of the remote control and to program the remote control for the other media devices that will interact with the MCE information handling system.

7. The method of claim 6 wherein:
   the user input media information comprises at least one of a make and model of a display device that will be coupled to the MCE information handing system, a make and model of home theater equipment to be used with the MCE information handing system and a physical location of where the MCE information handling system will be used.

8. The method of claim 7 wherein:
   the make and model of a device is used to determine whether a display device coupled to the information handling system is a television, a built-in display, a flat panel display, a projection monitor and to determine a default aspect ratio of the display.

9. The method of claim 7 wherein:
the make and model of the home theater equipment allows the MCE information handling system to be configured with an appropriate speaker arrangement.

10. The method of claim 7 wherein:
the physical location information is used to determine a location from where a correct media guide can be downloaded for the user.

11. A media center enabled (MCE) information handling system comprising:
a processor;
memory coupled to the processor, the memory comprising instructions for
configuring media control functions of the MCE information handling system according to user input media information, the instructions for configuring media control functions being stored on the memory during fabrication of the MCE information handling system, the user input media information comprising a make and model of a remote control to be used with the MCE information handling system; and
wherein
the make and model of the remote control is used to determine remote codes, a default infrared IR speed of the remote control and to program the remote control for the other media devices that will interact with the MCE information handling system.

12. The MCE information handling system of claim 11 wherein:
the user input media information comprises at least one of a make and model of a display device that will be coupled to the MCE information handing system, a make and model of home theater equipment to be used with the MCE information handling system and a physical location of where the MCE information handling system will be used.

13. The MCE information handling system of claim 12 wherein:
the make and model of a device is used to determine whether a display device coupled to the information handling system is a television, a built-in display, a flat panel display, a projection monitor and to determine a default aspect ratio of the display.

14. The MCE information handling system of claim 12 wherein:
the make and model of the home theater equipment allows the MCE information handling system to be configured with an appropriate speaker arrangement.

15. The MCE information handling system of claim 12 wherein:
the physical location information is used to determine a location from where a correct media guide can be downloaded for the user.

\* \* \* \* \*